(12) United States Patent
Vianello

(10) Patent No.: US 12,237,756 B2
(45) Date of Patent: Feb. 25, 2025

(54) COOLING COMPONENT FOR ELECTRIC MOTOR

(71) Applicant: TEXA DYNAMICS S.R.L., Monastier di Treviso (IT)

(72) Inventor: Bruno Vianello, Monastier di Treviso (IT)

(73) Assignee: TEXA DYNAMICS S.R.L., Monastier di Treviso (IT)

( * ) Notice: Subject to any disclaimer, the term of this patent is extended or adjusted under 35 U.S.C. 154(b) by 234 days.

(21) Appl. No.: 17/767,899

(22) PCT Filed: Oct. 1, 2020

(86) PCT No.: PCT/IB2020/059191
§ 371 (c)(1),
(2) Date: Apr. 10, 2022

(87) PCT Pub. No.: WO2021/070017
PCT Pub. Date: Apr. 15, 2021

(65) Prior Publication Data
US 2023/0074791 A1    Mar. 9, 2023

(30) Foreign Application Priority Data
Oct. 10, 2019  (IT) ......................... 102019000018461

(51) Int. Cl.
*H02K 9/22* (2006.01)
*H02K 3/30* (2006.01)
*H02K 21/24* (2006.01)

(52) U.S. Cl.
CPC .............. *H02K 9/223* (2021.01); *H02K 3/30* (2013.01); *H02K 21/24* (2013.01)

(58) Field of Classification Search
CPC ............ H02K 3/30; H02K 9/22; H02K 9/223; H02K 21/24
USPC .......................................................... 310/64
See application file for complete search history.

(56) References Cited

U.S. PATENT DOCUMENTS

| 8,310,126 B1 * | 11/2012 | Hopkins ................ H02K 9/223 310/216.057 |
| 2004/0061386 A1 * | 4/2004 | Amagi ..................... H02K 5/08 310/43 |
| 2011/0156504 A1 * | 6/2011 | Kurahara ............... H02K 3/325 310/43 |
| 2012/0067676 A1 | 3/2012 | Bramscher |

(Continued)

FOREIGN PATENT DOCUMENTS

| EP | 2720917 A1 | 4/2014 |
| EP | 3517336 A1 | 7/2019 |
| JP | 2007215334 A * | 8/2007 |

OTHER PUBLICATIONS

Kimura et al., English Machine Translation of JP2007215334A (Year: 2007).*

(Continued)

*Primary Examiner* — Rashad H Johnson
(74) *Attorney, Agent, or Firm* — Rivka Friedman

(57) ABSTRACT

A component of electric motor configured to cool windings mounted therein is described, wherein the component is made of a material formed by an aggregate of granules coated with an electrically insulating layer, wherein the granules are substantially in contact with each other.

18 Claims, 1 Drawing Sheet

(56) References Cited

U.S. PATENT DOCUMENTS

| | | | |
|---|---|---|---|
| 2012/0146434 A1* | 6/2012 | Nonaka | H02K 1/148 |
| | | | 310/43 |
| 2013/0009495 A1* | 1/2013 | Ueno | H02K 15/12 |
| | | | 310/43 |
| 2016/0236658 A1 | 8/2016 | Rozza | |
| 2021/0075282 A1* | 3/2021 | Girotto | H02K 5/203 |

OTHER PUBLICATIONS

Hoganas, "Somaloy, powders for electromagnetic applications", "Somaloy 3P Datasheet", <https://www.hoganas.com/en/powder-technologies/soft-magnetic-composites/products/coated-powders-for-electromagnetic-applications/> (Year: 2024).*

* cited by examiner

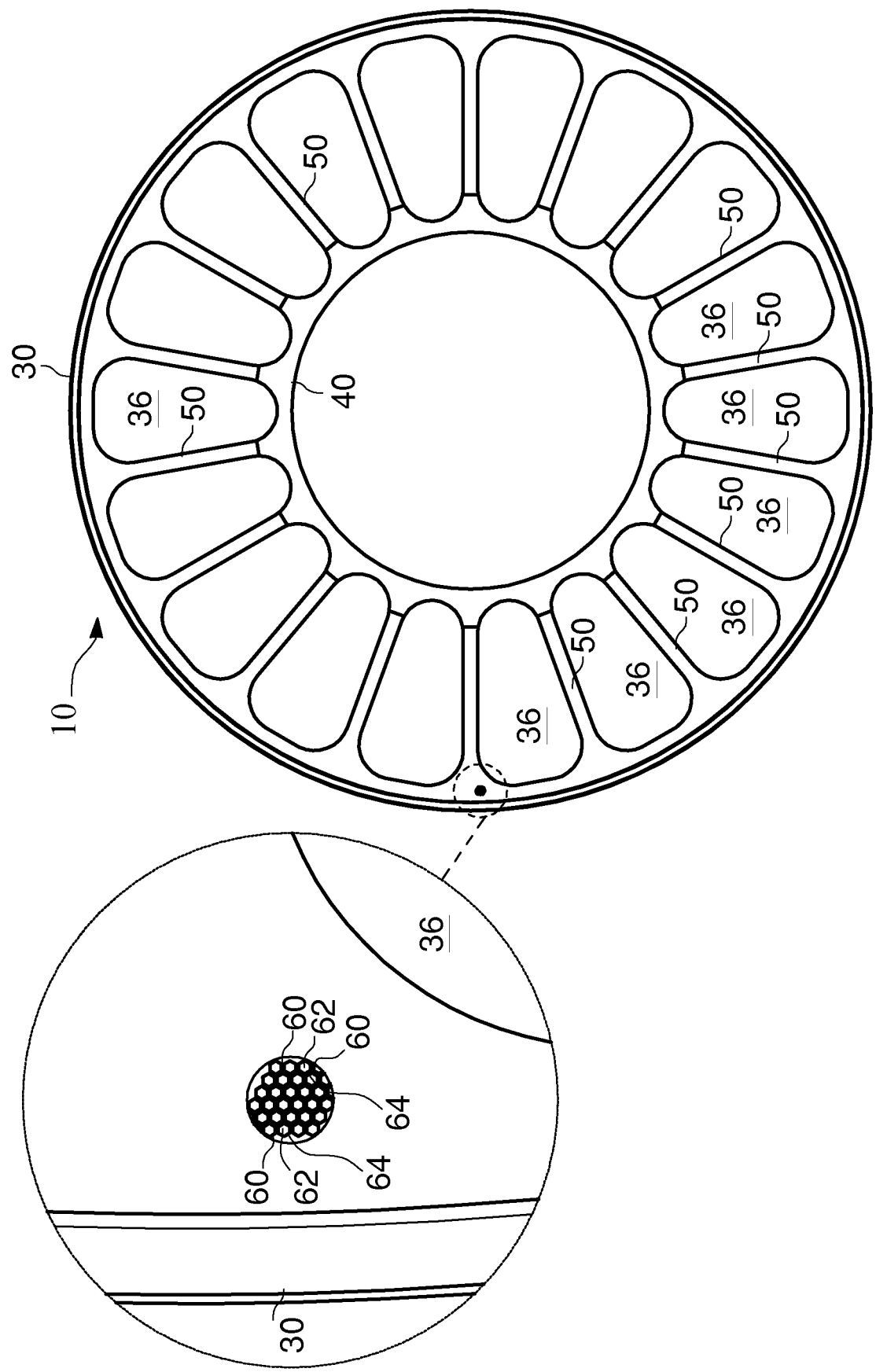

COOLING COMPONENT FOR ELECTRIC MOTOR

The invention refers—in general—to a cooling component for an electric motor, e.g. mounted on electric vehicles. The component can be advantageously applied especially to high-power electric motors for vehicles, here taken as an example.

High-power vehicles have electric motors with rated powers of hundreds of KW, hence the primary need to cool them.

The Applicant has made a stator of an electric motor capable of cooling the windings mounted in it, including an outer ring, an inner ring concentric to the outer ring, segments that extend radially from the inner ring to the outer ring, wherein the rings and segments are hollow inside and joined to form a continuous channel inside them capable of carrying a cooling fluid along a path that passes from one ring to another. The rings and segments are arranged to form or delimit pass-through openings capable of accommodating and surrounding the windings.

For optimum performance the stator must be able to be cooled very accurately, and its construction must prevent the generation of eddy currents inside it.

The main object of the invention is to improve this state of the art.

This object is achieved with a stator and/or component and/or method as in the attached claims, in which the dependent ones define advantageous variants.

An electric motor component is proposed, configured to cool windings mounted in it, wherein the component is made of a material formed by an aggregate of granules coated with an electrically insulating layer and preferably immersed in a binding matrix.

The granules in the aggregate are preferably metallic. The granules in the aggregate are preferably substantially in contact with each other.

In particular an electric motor's stator is proposed, configured to cool windings mounted in it, wherein for example the motor is mounted on an electric vehicle, the stator comprising
- an outer ring,
- an inner ring concentric to the outer ring,
- segments extending radially from the inner ring to the outer ring,
- wherein the rings and the segments are internally hollow and joined to form a continuous channel inside them capable of carrying a cooling fluid along a path that passes from one ring to the other,
- the rings and the segments being arranged to form or delimit pass-through openings capable of accommodating and surrounding the windings,
- wherein the stator is made of a material formed by metal granules coated with an electrically insulating layer and preferably immersed in a binding matrix.

With this structure the material behaves for electrical currents as a good insulator while it has a good thermal conductivity, given the proximity of the granules.

The granules may be made of copper, aluminum or iron, magnesium oxide or boron nitride; diamond, silver, gold, laminated aluminum, brass, platinum, laminated steel, lead, stainless steel. In general the material for the granules has thermal conductivity $\lambda[W \cdot m^{-1} \cdot K^{-1}] > 15$, more preferably $\lambda[W \cdot m^{-1} \cdot K^{-1}] > 100$, even more preferably $\lambda[W \cdot m^{-1} \cdot K^{-1}] > 300$.

The insulating layer may be a layer of oxide, or of insulating enamel or alumina, generally a plastic or a resin. The binding matrix may be glue, plastic, or a polymer or a resin or a technopolymer. The bonding matrix is optional, as a strong pressure can bind the insulating film of each individual granule.

The metal granules may have for example a maximum diameter of 1 mm, more preferably of 0.5 mm.

The relative percentage of metal granules inside the matrix is such that most of the granules touch or almost touch each other, so that the heat has continuous paths (the chains of attached or close together granules) across which to propagate.

The stator allows the fluid to circulate around the windings, increasing the heat pick-up area. In addition, the continuous channel ensures a watertight seal, and water can be used as a fluid to take advantage of its high heat capacity.

Preferably, for simplicity of construction, the outer ring and inner ring describe a circumference.

Preferably, for simplicity of construction, the segments are linear segments.

Preferably, for simplicity of construction, the outer ring and the inner ring lie substantially on a plane and are substantially coplanar.

Preferably, the outer ring, the inner ring and the segments are hollow shells.

Preferably the continuous channel forms a path that makes a complete turn around the center of the rings, so that heat is withdrawn extensively from the windings.

Preferably the segments extend radially along an axis passing through the center of the rings, and in particular with polar symmetry with respect to such center. As a result, the segments form for the rings a sort of hub-and-spokes pattern, which advantageously touches the sides of the windings from which it removes heat.

Preferably there is more than one continuous channel inside the stator, particularly two. Multiple channels allow for faster heat dissipation and a balanced dissipation, preventing e.g. the fluid at the end of a channel from being too hot to remove heat effectively.

It is convenient that the modular stator is a uniform solid, e.g. for ease of assembly.

A preferred structure for the hollow segments of each of said two or more superimposed and insulated parts is that the segments form a partition of an overall segment having a thickness equal to that of all the superimposed rings.

Preferably, in order to maximize heat dissipation, said pass-through openings have a contour complementary to the perimeter of the surrounding windings. In particular, the surface of the inner edge of the outer ring and the surface of the outer edge of the inner ring comprise cusps with the tips directed radially and facing the cusps of the opposite edge.

Another aspect of the invention concerns a method for building a component as defined above, in particular a stator for an electric motor, in one or each variant, with said aggregate material.

A variant of the method has the step of molding and/or compacting said material inside a mold to obtain the component.

Another aspect of the invention concerns an electric motor equipped with the stator or component as defined above in one or each of the variants.

In particular, the invention is preferably directed to the making of a stator of an axial flux electric motor, that is a motor having a stator with a circular series of windings, arranged around the rotation axis of a rotor, which generate a magnetic flux with polar axis parallel to the rotation axis of the rotor. This type of motor has a more complex structure than radial flux motors but is lighter and smaller the power being the same.

It is then proposed in particular an axial flow electric motor comprising:
- a rotor rotatable about a rotation axis and equipped with a circular series of magnetic elements (e.g. permanent magnets),
- a stator comprising a circular series of seats to house a circular series of windings, each capable of creating a magnetic field with the polar axis parallel to the rotation axis,
- wherein each winding is configured to create a magnetic field by which to rotate the rotor thanks to the magnetic interaction between the generated magnetic fields and the circular series of magnetic elements of the rotor,
- wherein the stator is made as in one or each variant defined herein.

Another aspect of the invention concerns an electric vehicle equipped with the motor as defined above in one or each of the variants.

The advantages of the invention will be clearer from the following description of a preferred embodiment of stator, referring to the attached drawing in which FIG. 1 shows a three-dimensional view of a stator.

FIG. 1 shows a stator 10 of an electric motor, consisting of an outer circular ring 30, an inner circular ring 40 concentric to the outer ring 30, and straight segments or spokes 50 radially joining the two rings 30, 40. The outer ring 30 and the inner ring 40 have center on the rotation axis of a rotor (not shown).

Two adjacent segments 50 and the arches of rings 30, 40 bounded by them delimit pass-through cavities 36 having perimeter complementary to windings mounted on the stator 10.

The number of segments or spokes 50 may vary, thus varying the number of windings.

The rings 30, 40 and the segments 50 are preferably hollow shells and overall they form inside them a continuous channel to carry a cooling fluid, which enters the stator 10 from an inlet and exits from an outlet.

The fluid circulation inside the stator 10 occurs along a path that involves at least once the two rings 30, 40 and at least two segments 50. In other words, the fluid circulates inside the stator 10 passing from the ring 30 to the ring 40 through a segment 50 and then passing from the ring 40 to the ring 30 through a different segment 50. During the flowing, the fluid skims the windings and subtracts heat from them.

The number of channels for the cooling fluid inside the component, in particular the number of independent channels, may vary. Two or more separate channels can better remove heat from the windings, providing a more uniform working temperature to the motor.

The stator 10 is made of a particular material, see zoom in FIG. 1.

The material is composed of compacted granules, or embedded in a binder 60. Each granule is formed by a metal core 62 coated with an electrically insulating layer or film 64.

The density of granules in the binder 60 is such that the distance between the granules is minimal, preferably all or almost all of them touching each other.

Thus the agglomerate of granules behaves overall as a good heat conductor, thanks to the continuity offered by the metal material that forms the close granules.

On the other hand, the agglomerate of granules behaves as a bad conductor of electric current, thanks to the insulating properties of the layer 64.

Therefore the stator 10 is able to remove well the heat generated by the windings without incurring significant losses caused by eddy currents.

The invention claimed is:

1. An axial-flow electric motor comprising a rotor and a stator configured to cool windings mounted therein,
    the stator comprising:
        an outer ring,
        an inner ring concentric to the outer ring,
        segments that extend radially from the inner ring to the outer ring,
    wherein the rings and the segments are internally hollow and are joined to form a continuous channel inside them capable of carrying a cooling fluid along a path that passes from one ring to the other,
    the rings and the segments being arranged to form or delimit pass-through openings able to receive and surround the windings;
    the windings being arranged in a circular series, arranged around the rotation axis of the rotor, to generate a magnetic flux with a polar axis parallel to the rotation axis of the rotor,
    the rotor being equipped with permanent magnets for interacting with the generated magnetic field,
    wherein the stator is made of a material formed by an aggregate of granules coated with an electrically insulating layer, wherein the granules are substantially in contact with each other.

2. The motor according to claim 1, wherein the material making up the granules has thermal conductivity $\lambda[\text{W} \cdot \text{m}^{-1} \cdot \text{K}^{-1}] > 15$.

3. The motor according to claim 2, wherein the insulating layer is a plastic material or a resin.

4. The motor according to claim 2, wherein the insulating layer is a layer of oxide, enamel or alumina.

5. The motor according to claim 2, wherein the granules are immersed in a binder matrix.

6. The motor according to claim 5, wherein the binder matrix is selected from: glue, plastic, or a polymer or a resin or a technopolymer.

7. The motor according to claim 1, wherein the material composing the granules is selected from: copper, aluminum or iron, magnesium oxide or boron nitride; diamond, silver, gold, laminated aluminum, brass, platinum, laminated steel, lead, stainless steel.

8. The motor according to claim 7, wherein the insulating layer is a plastic material or a resin.

9. The motor according to claim 7, wherein the insulating layer is a layer of oxide, enamel or alumina.

10. The motor according to claim 7, wherein the granules are immersed in a binder matrix.

11. The motor according to claim 10, wherein the binder matrix is selected from: glue, plastic, or a polymer or a resin or a technopolymer.

12. The motor according to claim 1, wherein the insulating layer is a plastic material or a resin.

13. The motor according to claim 1, wherein the insulating layer is a layer of oxide, enamel or alumina.

14. The motor according to claim 1, wherein the granules are immersed in a binder matrix.

15. The motor according to claim 14, wherein the binder matrix is selected from: glue, plastic, or a polymer or a resin or a technopolymer.

16. The motor according to claim 1, wherein the material making up the granules has thermal conductivity $\lambda[\text{W} \cdot \text{m}^{-1} \cdot \text{K}^{-1}] > 100$.

17. The motor according to claim 1, wherein the material making up the granules has thermal conductivity $\lambda[\text{W} \cdot \text{m}^{-1} \cdot \text{K}^{-1}] > 300$.

18. A method for constructing an axial-flux electric motor comprising a rotor and a stator configured to cool windings mounted therein, the stator comprising an outer ring, an inner ring concentric to the outer ring, segments that extend radially from the inner ring to the outer ring, joining the rings and the segments which are internally hollow to form a continuous channel inside them capable of carrying a cooling fluid along a path that passes from one ring to the other, arranging the rings and the segments to form or delimit pass-through openings able to receive and surround the windings, arranging the windings in a circular series, arranged around the rotation axis of the rotor, to generate a magnetic flux with a polar axis parallel to the rotation axis of the rotor, equipping the rotor being with permanent magnets for interacting with the generated magnetic field, and forming the stator of a material formed by an aggregate of metallic granules coated with an electrically insulating layer.

\* \* \* \* \*